United States Patent [19]

Vollmer et al.

[11] Patent Number: 5,785,747
[45] Date of Patent: Jul. 28, 1998

[54] VISCOSIFICATION OF HIGH DENSITY BRINES

[75] Inventors: Daniel P. Vollmer; Paul H. Javora; Robert L. Horton, all of Lafayette, La.

[73] Assignee: Great Lakes Chemical Corporation, West Lafayette, Ind.

[21] Appl. No.: 785,197

[22] Filed: Jan. 17, 1997

Related U.S. Application Data

[60] Provisional application No. 60/010,095 Jan. 17, 1996.

[51] Int. Cl.⁶ .................. C09K 3/00; C09K 7/00; C09K 7/02; C09K 7/06
[52] U.S. Cl. .................. 106/194.2; 106/205.72; 106/217.7; 106/287.26; 529/28; 529/35; 529/42; 529/43; 524/44; 524/45; 524/55; 524/386; 524/388; 507/100; 507/110; 507/111; 507/112; 507/113; 507/114; 507/115; 507/117; 507/118; 507/119; 507/209; 507/211; 507/212; 507/213; 507/214; 507/215; 507/216; 507/217; 507/222; 507/224
[58] Field of Search .................. 106/194.2, 205.72, 106/217.7, 287.26; 524/28, 35, 42, 43, 44, 45, 55, 386, 388; 507/100, 110, 111, 112, 113, 114, 115, 117, 118, 119, 209, 211, 212, 213, 214, 215, 216, 217, 221, 224

[56] References Cited

U.S. PATENT DOCUMENTS

| | | | |
|---|---|---|---|
| 3,485,651 | 12/1969 | Ganz et al. | |
| 3,899,439 | 8/1975 | Mahlman | |
| 3,953,335 | 4/1976 | Jackson | 252/8.5 |
| 4,071,457 | 1/1978 | Meister | 252/8.55 |
| 4,312,675 | 1/1982 | Pickens et al. | 106/171 |
| 4,325,861 | 4/1982 | Braun et al. | |
| 4,330,414 | 5/1982 | Hoover | |
| 4,357,260 | 11/1982 | Sandford et al. | |
| 4,425,241 | 1/1984 | Swanson | |
| 4,453,979 | 6/1984 | DeMasi et al. | |
| 4,513,818 | 4/1985 | Michels | 166/244 |
| 4,582,614 | 4/1986 | House et al. | |
| 4,599,180 | 7/1986 | Vio et al. | |
| 4,600,515 | 7/1986 | Gleason et al. | |
| 4,609,476 | 9/1986 | Heilweil | 252/8.55 |
| 4,621,692 | 11/1986 | Mondshine | 166/281 |
| 4,646,834 | 3/1987 | Bannister | 166/291 |
| 4,743,384 | 5/1988 | Lu et al. | 252/8.514 |
| 4,799,962 | 1/1989 | Ahmed | |
| 4,822,500 | 4/1989 | Dobson, Jr. et al. | 252/8.551 |
| 4,883,537 | 11/1989 | Burdick | |
| 4,900,457 | 2/1990 | Clarke-Sturman et al. | 252/8.514 |
| 5,028,263 | 7/1991 | Burdick | |
| 5,099,930 | 3/1992 | Enright et al. | |
| 5,112,965 | 5/1992 | Fujishige et al. | |
| 5,120,708 | 6/1992 | Melear et al. | 507/126 |
| 5,194,422 | 3/1993 | Mueller et al. | 507/136 |
| 5,198,415 | 3/1993 | Steiger | 507/103 |
| 5,228,909 | 7/1993 | Burdick et al. | |
| 5,236,496 | 8/1993 | Shibuya et al. | 106/194.2 |
| 5,246,490 | 9/1993 | Kehoe et al. | |
| 5,248,665 | 9/1993 | Hale et al. | 507/136 |
| 5,260,269 | 11/1993 | Hale et al. | 507/136 |
| 5,362,312 | 11/1994 | Skaggs et al. | |
| 5,415,228 | 5/1995 | Price et al. | 166/278 |
| 5,436,227 | 7/1995 | Hale et al. | 507/136 |
| 5,504,062 | 4/1996 | Johnson | 507/212 |

FOREIGN PATENT DOCUMENTS

| | | | |
|---|---|---|---|
| 0 505 169 A1 | 9/1992 | European Pat. Off. | E21B 43/25 |
| 0 572 113 A1 | 12/1993 | European Pat. Off. | C09K 1/02 |
| 0572113A1 | 12/1993 | European Pat. Off. | |
| WO 93/16144 | 8/1993 | WIPO | |
| WO 94/09253 | 4/1994 | WIPO | |
| WO 95/21900 | 8/1995 | WIPO | C09K 7/02 |
| WO 95/24452 | 9/1995 | WIPO | |

OTHER PUBLICATIONS

CA 118:172277, Lau et al, "Aqueous polysaccharide compositions and their use", Jun. 17, 1992.
CA 76:142606, Etes, "Plastic of gel compositions", Feb. 8, 1972.
CA 122:64429, Shimizu et al, "Nonaqueous pastes for application to oral mucosa", Oct. 11, 1994.
CA 127:178606, Vollmer et al, "Viscosification of high-density brines", Jan. 17, 1997.

*Primary Examiner*—David Brunsman
*Attorney, Agent, or Firm*—Woodard, Emhardt, Naughton, Moriarty & McNett

[57] ABSTRACT

The present invention provides compositions useful for viscosifying aqueous fluids, methods for making them and methods for using them. In one aspect of the invention, inventive compositions comprise a prehydrating alcohol having at least two hydroxyl groups and having a molecular weight of from about 60 to about 600; an inorganic salt; and a polymer. In a preferred aspect of the invention, the viscosifier composition additionally comprises a solvent having a molecular weight of from about 75 to about 1000. According to another aspect of the invention, inventive compositions comprise a prehydrating alcohol; an inorganic salt; and a polymer; and the composition is essentially free from water. Inventive compositions find advantageous use in viscosifying fluids utilized in subterranean drilling activities such as, for example, drilling, drill-in, completion, hydraulic fracturing, work-over, packer, well treating, testing, spacer, or hole abandonment fluids.

51 Claims, No Drawings

VISCOSIFICATION OF HIGH DENSITY BRINES

REFERENCE TO RELATED APPLICATIONS

This application claims priority upon U.S. patent application Ser. No. 60/010,095 filed Jan. 17, 1996, which is hereby incorporated by reference in its entirety.

BACKGROUND OF THE INVENTION

1. Field of the Invention

The exploitation of subterranean formations is the general field of this invention. More specifically, the invention relates to the exploitation of subterranean petroliferous formations using drilling, drill-in, completion, hydraulic fracturing, work-over, packer, well treating, testing, spacer, or hole abandonment fluids. Yet more specifically, the field of this invention is drilling fluid rheology, thickeners, viscosifiers, viscoelastic fluids, and the physical hydration of polymer additives to drilling, drill-in, completion, hydraulic fracturing, work-over, packer, well treating, testing, spacer, or hole abandonment fluids.

2. Description of Related Art

Brines are commonly used in drilling, drill-in, completion, hydraulic fracturing, work-over, packer, well treating, testing, spacer, or hole abandonment fluids because of their advantageous properties such as, for example, a wide density range and the character of being free of suspended solids and essentially non-damaging to subterranean petroliferous formations. Table 1 lists examples of brines advantageously used as completion and work-over fluids and gives the density ranges within which they are useful as such.

TABLE 1

Brines Used As Completion or Work-Over Fluids

| Brine Composition | Brine Density Range |
| --- | --- |
| Aqueous KCl | 8.3–9.7 pounds per gallon (ppg) |
| Aqueous NaCl | 8.3–10.0 ppg |
| Aqueous NaHCO$_2$ | 8.3–10.0 ppg |
| Aqueous CaCl$_2$ | 8.3–11.6 ppg |
| Aqueous KHCO$_2$ | 8.3–13.3 ppg |
| Aqueous NaBr | 8.3–12.7 ppg |
| Aqueous NaCl/NaBr | 10.0–12.7 ppg |
| Aqueous CaCl$_2$/CaBr$_2$ | 11.6–15.1 ppg |
| Aqueous CaBr$_2$ | 8.3–15.3 ppg |
| Aqueous CaCl$_2$/CaBr$_2$/ZnBr$_2$ | 15.1–19.6 ppg |
| Aqueous CaBr$_2$/ZnBr$_2$ | 14.2–21.0 ppg |

One problem commonly encountered in the field of subterranean drilling is that fluids utilized in the drilling process escape into the formation, or surrounding rock. Thus, during the process of drilling and completing, for example, an oil well, it is often desirable to add polymer or polymer and bridging agents to viscosity the drilling or completion fluid and to control fluid loss to the formation. Sized particles of calcium carbonate or sodium chloride are examples of materials typically used as bridging agents. As fluids are lost into the formation, a filter cake builds up at the rock face which limits the further flow of fluids into the formation. Some fluids nevertheless invariably flow into the formation and can interact with formation rock in such a way as to reduce the permeability of the matrix to the subsequent in-flow or out-flow of fluid, especially oil, gas, condensate, or other fluid targeted for withdrawal and use. This reduction in the rock permeability is termed "formation damage".

Another reason polymers are added to brines during drilling or fracturing operations is to thicken the brine so that it will have high carrying capacity for the cuttings produced while drilling, or for the transport of proppant while fracturing. Xanthan gum, for example, has the ability to impart gel character to a brine so that it will have high carrying capacity for drill cuttings when the drilling process is interrupted and the fluid becomes quiescent. Alternatively, the use of hydroxyethylcellulose (HEC) as a typical viscosifier and fluid loss control agent which causes relatively little damage to the formation is taught, for example, by Tuttle, R. N. and Barkman, J. H., "New Non-Damaging and Acid-Degradable, Drilling and Completion Fluids," *J. Petro. Technol.*, Nov., 1974, p. 1221–1226. Guar gum and starch derivatives can also be used. However, xanthan gum, HEC and other polymers are very slow to viscosity high density brines above about 12.0 pounds per gallon (ppg). An additional problem with HEC is that it does not viscosify near-saturated formate brines. Heating can be used to speed up the process, but 5 hours of mixing for HEC may be required to reach maximum viscosity as discussed by Darley, H. C. H., and Gray, G. P., *Composition and Properties of Drilling and Completion Fluids*, 5th ed., 1991, p. 528.

For many applications of brine-based drilling fluids, HEC lacks sufficient thermal stability and carrying capacity for the drill cuttings; in these cases, therefore, xanthan gum is typically used instead. While such agents as guar, hydroxypropyl guar, HEC and xanthan gum impart both viscosity and fluid loss control to the drilling, drill-in, completion, hydraulic fracturing, work-over, well treating, spacer, or hole abandonment fluids, starch is often added to augment the fluid loss control properties.

Perhaps the greatest difficulty encountered in the art of viscosifying fluids is that the addition of polymers, such as, for example, HEC and xanthan to water or aqueous brines leads to the formation of "fisheyes", or lumps. These fisheyes (also referred to as "microgels") commonly occur, for example, when dry polymer is added to an aqueous solution. Fisheyes result when conditions cause hydration of the polymer to occur so quickly that the polymer is not able to disperse before hydration of the outer portion of a given small quantity of polymer causes an outer layer of the polymer to gel. As such, the outer part of the polymer forms a gel coating which inhibits contact between the inner part of the quantity of dry polymer and the solution. With limited contact, hydration of this inner part is arrested or at least retarded and a fisheye results. These fisheyes can cause formation damage in drilling, completion, hydraulic fracturing or work-over operations.

The prior art teaches that the formation of "fisheyes" may be prevented when water or aqueous brines are viscosified by using liquid viscosifiers. The term "liquid viscosifier" (also referred to as "fluid viscosifier") designates a fluid system wherein a polymer is carried, thus facilitating its dispersion and hydration in a target aqueous solution such as, for example, water, brine or dense brine. When polymer in the form of a conventional liquid viscosifier is added to a dense brine, however, fisheyes can also occur. In a given small quantity of more concentrated polymer, the outer part of the polymer forms a gel coating which inhibits contact between the inner part of the quantity of more concentrated polymer and the dense brine. With limited contact and the activity of free water already somewhat limited in the dense brine, hydration of this inner part is arrested or at least retarded and a fisheye results. Again, formation damage and other problems in drilling, completion hydraulic fracturing or work-over operations can result from the presence of the fisheyes.

A great amount of attention has been given to developing fluid viscosifiers having improved ability to evenly and quickly viscosity aqueous systems. Some fluid viscosifiers which have been taught in the prior art include therein hydrophobic solvent bases, including mineral oil, diesel oil, alcohols of 6-12 carbons, and polypropylene glycol (molecular weight of at least 1000). Other fluid viscosifiers taught in the prior art include therein solvating agents such as, for example, ethylene glycol, 1,2-propanediol, 1,4-butanediol, 1,3-pentanediol, glycerol, 1,2,3-butane-triol, 1,2,3-pentane-triol, formamide, acetamide, dimethyl formamide, and the like. Yet other fluid viscosifiers require the use of "insolubilizers" such as, for example, methylene chloride, nitromethane, acrylonitrile, n-propyl alcohol, n-butyl alcohol, sec-butyl alcohol, iso-butyl alcohol, amyl alcohols, hexyl alcohols, cyclohexanol, pentylamines, hexylamines, heptylamines, octylamines, phenol, and substituted phenols. Liquid viscosifiers taught in the prior art, however, have proven unsatisfactory. The present invention provides low-cost liquid viscosifiers that allow aqueous fluids to be readily and evenly viscosified with minimal shear or no added heat.

As one example of a liquid viscosifying system taught in the prior art, U.S. Pat. No. 3,485,651 teaches the dispersion of water-soluble polymers using a water-miscible, relatively inert, substantially dry liquid carrier that has no swelling effect on and essentially no dissolving effect on the polymer associated therewith. As another example of a liquid viscosifier taught in the prior art, U.S. Pat. No. 4,312,675 teaches the use of polymers such as, for example, xanthan gum and guar gum up to 65 weight percent in a hydrophobic solvent base like mineral oil, diesel oil, alcohols of 6-12 carbons, and polypropylene glycols having a molecular weight of 1000 or greater. This liquid improves dispersibility but the presence of the hydrocarbon phase can cause formation-damaging emulsions. Because the hydrocarbon phase is inherently immiscible with the drilling fluid, the technology is difficult to control and the resulting high density brines lack broad ranging compatibility with, for example, sea water, formation waters and spacers.

A similar system is described in U.S. Pat. No. 4,325,861, which teaches the use of a concentrate of a water-soluble particulate polymer, a water-insoluble organic vehicle, a non-ionic surfactant, and, if necessary, a thickening agent. The presence of both a hydrocarbon phase and a surfactant can cause formation-damaging emulsions. Also, because the hydrocarbon phase is inherently immiscible with the drilling fluid, the technology is difficult to control and the resulting high density brines lack broad ranging compatibility with, for example, sea water, formation waters and spacers.

U.S. Pat No. 4,883,537 teaches the introduction of potassium carbonate salt to suspend carboxymethyl cellulose or sodium carboxymethyl cellulose; however, fluid-fluid and fluid-rock compatibility test results indicate that brines containing potassium carbonate produce precipitation reaction products when intermixed with a range of synthetic and natural formation waters. This reaction potentially leads to almost total loss of formation rock permeability. L. R. Houchin, W. E. Foxenberg, and Jun Zhao, "Evaluation of Potassium Carbonate as a Non-Corrosive, Chloride-Free Completion Fluid," paper SPE 27392, presented at the SPE Int'l Symposium on Formation Damage Control, Lafayette, La., 7-10 Feb. 1994.

As discussed above, a variety of well servicing fluids and associated additive systems have been proposed in the prior art. Systems proposed to date, however, have proven unsatisfactory due to such problems as formation damage, production of fisheyes and difficulty in achieving even mixing. There remains a need for improved systems having advantageous characteristics for viscosification and fluid loss control, dispersibility and hydration. By using the liquid, slurry or paste product of the present invention, low density and high density brines may be viscosified readily and evenly with water-soluble or water-dispersible polymers. These viscosified brines are useful as viscosified, brine-based drilling fluids which would be extremely difficult to make by adding the dry polymer or other previously-known liquid viscosifier formulations to the brine

SUMMARY OF THE INVENTION

According to the present invention, there are provided viscosifier compositions for advantageously viscosifying aqueous solutions. In one aspect of the invention, inventive compositions comprise a dihydric or polyhydric alcohol having a molecular weight of from about 60 to about 600 ("prehydrating alcohol"); an inorganic salt; and a water-soluble or water-dispersible polymer. In this composition, a physical interaction between the alcohol and the polymer in the presence of the salt results in a surprisingly advantageous feature of the composition, namely, that the composition is able to disperse the polymer into an aqueous medium before excessive hydration of the polymer causes the formation fisheyes. This overcomes problems in prior art viscosifier compositions, where rapid hydration of the polymer in the viscosifier composition causes the formation of fisheyes before dispersion of the polymer is achieved. The viscosifier composition may additionally comprise a solvent having a molecular weight of from about 75 to about 1000. The addition of a high molecular weight solvent allows manipulation of physical characteristics of the viscosifier composition for more advantageous use with regard to various applications. Preferably, the solvent is a high molecular weight dihydric or polyhydric alcohol.

In one preferred embodiment, the composition is essentially free from water. The absence of water in this composition provides increased assurance that the polymer or polymers present will not become overly hydrated and, thus, will not solidify prematurely, thus making dispersion of the viscosifier composition into an aqueous medium extremely difficult. In another embodiment, water may be present, but its presence is accompanied by one or more inorganic salts in an amount sufficient to substantially saturate the water. This too prevents the polymer from becoming overly hydrated prematurely.

The present invention also provides methods for making viscosifier compositions, including a method comprising mixing an inorganic salt with a prehydrating alcohol to yield a first mixture; and mixing a polymer with the first mixture to yield a viscosifier composition. According to another aspect of the invention, inventive methods comprise mixing an inorganic salt with a prehydrating alcohol to yield a first mixture; mixing a solvent having a molecular weight of from about 75 to about 1000 with the first mixture to make a second mixture; and mixing a polymer with the second mixture to yield a viscosifier composition. Alternatively the polymer can be mixed with the first mixture before adding the solvent to yield the viscosifier composition.

According to another aspect of the invention, there are provided methods for viscosifying an aqueous fluid, these methods comprising providing a viscosifier composition; and mixing the viscosifier composition with an aqueous fluid to provide a viscosified fluid. The viscosified fluid may then be used as a superior alternative to conventional drilling, drill-in, completion, hydraulic fracturing, work-over, packer, well treating, testing, spacer, or hole abandonment fluids.

It is an object of the present invention to provide compositions and methods whereby polymers may be more easily hydrated in high or low density brines.

It is also an object of the invention to provide compositions and methods whereby the formation of microgels or "fisheyes" is prevented in viscosified water or brines.

Additionally, it is an object of the invention to provide compositions and methods for viscosifying high density brines uniformly.

It is another object of the invention to provide methods for producing viscosified high density brines with more stable rheological properties, especially at elevated temperatures and over extended periods of time, the rheological properties being more resistant to degradation.

It is also an object of the invention to provide viscosifier compositions for high density brines in a form which is advantageously easy to transport and use.

Another object of the invention is to provide viscosifiers which are in paste or liquid form and which can therefore be mixed rapidly with high density brines without interrupting, for example, drilling operations.

Also, it is an object of the invention to provide methods for using high density brine viscosifiers by producing them in an un-cross-linked or less cross-inked form, allowing them to mix, disperse, and hydrate, and then subsequently cross-linking them or further cross-linking them.

Finally, it is an object of the present invention to provide viscosified high density brines with a broad range of compatibility with, for example, fluid-loss agents, sea water, formation waters and spacers.

Further objects, features and advantages will be apparent from the following description.

DESCRIPTION OF THE PREFERRED EMBODIMENTS

For the purpose of promoting an understanding of the principles of the invention, reference will now be made to preferred embodiments thereof and specific language will be used to describe the same. It will nevertheless be understood that no limitation of the scope of the invention is thereby intended, such alterations and further modifications in the invention, and such further applications of the principles of the invention as described therein being contemplated as would normally occur to one skilled in the art to which the invention relates.

Although it is taught in the prior art that water-soluble polymers like xanthan gum will solvate not only in water but also in ethylene glycol and glycerol, it has been found that mixing, for example, about 10 weight percent of a water-soluble polymer like xanthan gum into glycol while stirring causes the mixture to form a solid gel which cannot easily be added to a brine solution. It has also been found that water-soluble polymers like xanthan gum do not solvate substantially in propylene glycol, triethylene glycol, tetraethylene glycol, triethanolamine, and higher MW polyethylene glycols, but for the most part just settled in the solution. The present inventors have made the surprising discovery that by introducing an inorganic salt into, for example, ethylene glycol or glycerol before adding a water-soluble polymer, the resulting mixture forms a thick liquid or a paste which can be readily hydrated into a wide variety of aqueous fluids. An example of an aqueous fluid to which addition of inventive viscosifier compositions is advantageous is a brine used in drilling operations into subterranean petroliferous formations wherein the drilling fluid needs or requires suspension or carrying capacity. With the addition of, for example, propylene glycol or higher MW glycols, the consistency of the viscosifier composition may be controlled to give a liquid, slurry or paste form having a wide range of consistencies. Although it is not intended that the present invention be limited by theoretical mechanisms by which the advantageous result is achieved, it is believed that the thick liquid or paste form indicates a prehydration of the polymer. "Prehydration" is intended to mean that the polymer does not fully hydrate (and therefore does not solidify) but instead physically interacts with the alcohol in the presence of the salt to become surprisingly more capable of being dispersed into and evenly hydrated by aqueous fluids. The liquid or paste thus prepared may readily be added to a high density brine to evenly viscosity the brine, for example, within about an hour, whereas if the dry polymer is added it will not evenly viscosity or will need extended mixing times, high shear or heat to do so.

One starting material needed to practice the invention is one or more alcohols having at least two hydroxyl groups and having a molecular weight of between about 60 and about 600. For purposes of describing and claiming the present invention, this alcohol is designated "prehydrating alcohol." In a preferred aspect of the invention, the prehydrating alcohol or mixture of one or more prehydrating alcohols preferably has a molar ratio of carbon atoms to hydroxyl groups of between about 0.5 and about 3.0. Preferably, the prehydrating alcohol is selected from the group consisting of ethylene glycol, glycerol, propylene glycol, pentaerythritol, di- and tri-ethylene glycols, di- and tri-glycerols, butanediols and pentanediols.

Another starting material in accordance with a preferred embodiment of the present invention is a solvent having a molecular weight of from about 75 to about 1000. Preferably the solvent is a dihydric or polyhydric alcohol having a molecular weight of between about 75 and about 500 (collectively referred to herein as an "alcohol solvent"). A dihydric alcohol is one having two hydroxyl groups, and a polyhydric alcohol is one having three or more hydroxyl groups. Those having three hydroxyl groups (trihydric) are glycerols, and those with more than three include, for example, sugar alcohols, which have the general formula $CH_2OH(CHOH)_nCH_2OH$. It should be carefully noted that for purposes of describing the present invention, the terms "prehydrating alcohol" and "alcohol solvent" are intended to have distinct meanings, as described above. Although there is some overlap between the designations of prehydrating alcohol and alcohol solvent as defined above, these classes of compounds are distinguished in that, at temperatures at or near ambient, an alcohol solvent does not have an appreciable physical interaction with the particular polymer selected in accordance with the invention. In contrast, a prehydrating alcohol does physically interact with the polymer, resulting in a swelling effect, partial hydration or partial solvation of the polymer. Examples of high molecular weight alcohol solvents contemplated for use in accordance with the present invention include, for example, polyethylene glycols, polypropylene glycols, OH-terminated alkoxy-polyethoxylates, and glycol ethers.

Another starting material necessary to practice the invention is a water-soluble or water-dispersible polymer (also referred to herein as a "viscosifying polymer"). In one preferred aspect of the invention, the polymer is a biopolymer. As used herein, the term "biopolymer" is intended to designate a polymeric substance formed in a biological system. More preferably, the polymer is selected from the group consisting of algin, anionic cellulose, anionic polysaccharide, cationic polysaccharide, carboxymethyl cellulose, carboxymethyl hydroxyethyl cellulose, gellan gum, guar gum, gum ghatti, gum karaya, gum tragacanth, gum arabic, gum acacia, locust bean gum, methacrylic acid polymer, polyamine, polyanionic cellulose, iota, lambda or kappa sulfated polysaccharides, polysaccharides modified by i) cross-linking, ii) hydroxyethylation, iii) hydroxypropylation, iv) carboxymethyl-hydroxy-ethylation or v) carboxymethyl-hydroxypropylation, rhamsan gum, vinyl compound polymer, wellan gum, or glycol-compatible wellan gum, or xanthan or xanthan gum or mixture of said polymers. Even more preferably, the polymer is selected from the group consisting of anionic polysaccharide; cationic polysaccharide; gellan gum; guar gum; rhamsan gum; wellan gum; xanthan; or xanthan gum; or modifications of these polymers by i) cross-inking, ii) hydroxyethylation, iii) hydroxypropylation, iv) carboxymethyl-hydroxy-ethylation v) carboxymethyl-hydroxypropylation, or (iv) carboxymethylation; or mixture of said polymers. It is readily understood that additional polymers having rheological and/or thixotropic characteristics similar to those specifically mentioned may also be advantageously used in accordance with the present invention. A wide variety of polymers useful according to the present invention are readily available commercially.

Another starting material required to practice the invention is an inorganic salt. Preferably, the salt is a hydrophilic salt. Preferred hydrophilic salts used in accordance with the invention are those which, when added, will inhibit the full hydration or solvation of the polymer.

It is readily understood in the relevant field that additional materials which may be present in inventive compositions include, for example, additional fluid loss control agents, bridging agents, corrosion inhibitors, lubricants, pH control additives, surfactants, solvents, and weighting agents.

Viscosifier compositions are made in accordance with the invention by providing a mixture of one or more hydrophilic salts and one or more prehydrating alcohols and prehydrating a polymer by mixing it therein. Prehydration is indicated by a thickening of the mixture into a viscous liquid, a slurry or a paste. A preferred method additionally includes adding a solvent, preferably an alcohol solvent to the mix. The solvent may preferably be added at any stage of preparation, i.e., it may be added to the prehydrating alcohol before adding the salt; it may be added to the salt/prehydrating alcohol mixture before adding the polymer; or it may be added after the polymer is added. By controlling the amount of solvent added, the physical properties of the viscous liquid or paste may be more closely controlled.

Inventive viscosifier compositions prepared in accordance with the invention comprise from about 1 to about 65 percent polymer by weight; from about 0.1 to about 50 percent salt by weight; and from about 2 to about 85 percent prehydrating alcohol by weight. More preferably, inventive compositions comprise from about 5 to about 40 percent polymer by weight; from about 1 to about 40 percent salt by weight; and from about 10 to about 85 percent prehydrating alcohol by weight. Most preferably, the composition is from about 5 to about 25 percent polymer by weight; from about 2 to about 35 percent salt by weight; and from about 20 to about 85 percent prehydrating alcohol by weight.

As stated above, inventive viscosifier compositions may also comprise a solvent, preferably an alcohol solvent. In this particular embodiment, the viscosifier composition preferably comprises from about 1 to about 65 percent polymer by weight; from about 0.1 to about 50 percent salt by weight; from about 2 to about 85 percent prehydrating alcohol by weight; and from about 0 to about 60 percent solvent by weight. More preferably, the viscosifier composition comprises from about 5 to about 40 percent polymer by weight; from about 1 to about 40 percent salt by weight; from about 20 to about 85 percent prehydrating alcohol by weight; and from about 0 to about 60 percent solvent by weight In one preferred viscosifier composition according to the teachings of the present invention, the solvent is propylene glycol, the polymer is xanthan gum, and the prehydrating alcohol is selected from the group consisting of ethylene glycol, glycerol and mixtures thereof. In another preferred viscosifier composition, the solvent is propylene glycol, the polymer is guar gum, and the prehydrating alcohol is selected from the group consisting of ethylene glycol, glycerol and mixtures thereof. Various specific viscosifier compositions are described in greater detail in the Examples.

Inventive viscosifier compositions in the form of a slurry, liquid or paste find advantageous use when dispersed into an aqueous fluid such as, for example, water, brine, or a dense brine to yield a viscosified fluid. In one preferred aspect of the invention, the slurry, liquid or paste is dispersed into a calcium- or zinc-based brine having a density of at least about 9 pounds per gallon (ppg). In another preferred aspect of the invention, the aqueous fluid into which the viscosifier composition is dispersed is a formate-based brine having a density of at least about 9 ppg. The brines having a viscosifier composition thus added may then preferably be subjected to shear as from a stirrer, shearing stirring, shear pump or the like. The resulting viscosified fluid may then be advantageously used, for example, in oil well drilling, drill-in, completion, hydraulic fracturing or work-over, or as a packer, well treating, subterranean petroliferous formation testing, spacer, or hole abandonment fluid, or as a displacement pill.

A wide variety of high density brines may be viscosified as described herein that would be either extremely difficult or impossible by adding the polymer dry to the brine. Using mixtures of dry salts and solvents like ethylene glycol or glycerol to formulate water-soluble polymers into soft pastes or liquid forms can permit high density brines to be viscosified without fisheyes being formed in cases where the use of conventional viscosifiers cannot fully hydrate the polymer formulation and uniformly viscosity a high density brine except through the application of extended mixing, shearing, heating, and/or dilution.

In a preferred method of viscosifying an aqueous fluid for various applications in the field of subterranean drilling, cross-linkers are mixed into the viscosified fluid. As used herein, the term "cross-linker" is intended to designate a substance capable of bonding with two or more sites on a polymer or on different polymers. Preferred cross-linkers include boron, aluminum, titanium, vanadium, chromium, zirconium, or mixtures thereof. As is readily understood by one of ordinary skill in the art, inventive compositions may also advantageously include additional fluid loss control agents, corrosion inhibitors, lubricants, pH control additives, surfactants, solvents, and/or weighting agents.

Because dense brines can be viscosified more readily and easily through the practice of the present invention than through conventional practices, less mixing, shearing, heating, or diluting is required to produce a viscosified dense brine which is free of microgels or fisheyes. Furthermore, whenever less shear stress is applied to initially hydrate the polymer, less shear-degradation can be expected. Therefore, the rheological properties of inventive compositions are more stable at elevated temperatures over extended periods of time. Similarly, whenever less heating is applied in the process of blending the viscosified dense brine, less thermal-degradation can be expected; therefore, an advantageous feature of the present invention is that the rheological properties of an inventive viscosified dense brine are more stable at heightened shear stress over extended periods of time. Because the viscosification of the dense brine is more uniform and fewer products of thermal- and shear-degradation of the viscosifier are present, the physical and chemical properties of the viscosified brine are inherently more reliable, reproducible, and controllable. Enhanced reliability, reproducibility, and controllability lead to broadening of the range of compatibility to be expected between viscosified dense brines and, for example, various fluid-loss agents, sea water, formation waters and spacers. These and other advantages and benefits to be gained as a result of the practice of the present invention will be apparent to one skilled in the art.

The invention will be further described with reference to the following specific Examples. It will be understood that these Examples are illustrative and not restrictive in nature.

EXAMPLE ONE

PREPARING INVENTIVE VISCOSIFIER COMPOSITIONS

Inventive viscosifier compositions are prepared by first mixing one or more selected inorganic salts into a prehydrating alcohol, and then adding a water-soluble or water-dispersible polymer to the salt/prehydrating alcohol mixture. Optionally, heat and/or shear are provided to facilitate mixing of the materials.

EXAMPLE TWO

PREPARING INVENTIVE VISCOSIFIER COMPOSITIONS

Inventive viscosifier compositions are prepared according to Example 1, with the further addition of an alcohol solvent. The alcohol solvent is optionally added either before or after polymer is added to the salt/prehydrating alcohol mixture. As another alternative, the alcohol solvent is combined with the prehydrating alcohol before adding the salt.

EXAMPLE THREE

TESTING PROPERTIES OF DENSE VISCOSIFIED AQUEOUS COMPOSITIONS

Viscosity Measurements

A viscosifier composition is prepared as in Example 1 or Example 2 and mixed, for example, with a dense brine to viscosity the brine. Rheological properties of the viscosified brine are measured and recorded at 120° F. using a rotational viscometer such as the Fann 35 at the following rpms: 600, 300, 200, 100, 6 and 3. Also measured and recorded are the pH of the fluid at 120° F., and the 10 second and 10 minute gels.

Determining Heat Stability

One "barrel equivalent" (BEQ) of the fluid is hot rolled at a predetermined temperature for 16 hours; and one BEQ of the fluid is hot rolled at the predetermined temperature for 72 hours (or 48/96 hours if time is available for longer testing). A normal 42 gallon barrel has a weight in pounds equal to $(42 \times \rho)$, where $\rho$ is the density of the fluid in pounds per gallon. The BEQ is obtained by simply replacing the weight of the barrel in pounds by the weight of the barrel equivalent in grams. This replacement scales the convenient field unit, the barrel, into a workable laboratory size unit, BEQ.

After the rheological properties are recorded from the Fann 35 or equivalent for the 16/72 hour or 48/96 hour samples, as indicated above, the samples are examined for evidence of sag, break, or settling and the visual observations are logged. The gels of hot rolled samples of inventive compositions are preferably within the range of from about 6 to about 19.

Fluid Loss Testing

A fluid loss test of duration ranging from 30 minutes to 24 hours is performed in the API standard high pressure high temperature (HP-HT) apparatus. If additional time for testing is available, a 48 hour test duration may be preferable. The testing temperature is predetermined, such as, for example, in accordance with the bottom-hole temperature at which the fluid will be used in the field. The HP-HT apparatus is employed using 250 to 600 psig differential pressure, using, for example, a 50–2000 millidarcy Aloxite disc of diameter of 2.50 inches and thickness of 0.25 inches.

The cell in the heating jacket and the fluid in the static oven are preheated until the cell and sample reach the test temperature. While the cell is being heated, the disc is covered with a thin layer of de-ionized water. The cover (lid) for the cell should also be put in place to prevent evaporation.

The fluid being tested is preheated and then poured into the preheated cell. The loaded cell is then prepared for the application of pressure. The cell is pressurized and the temperature adjusted to the target temperature. The discharge valve is then opened, and the filtrate volume is recorded at time intervals such as 1, 5, 7.5, 10, 15 and 30 minutes, and at 1, 2, 4, 16, 24 and/or 48 hours. The fluid loss volume may then be plotted versus $(\text{time})^{1/2}$. This plot is, in most cases, substantially linear. If the plot is linear, the fluid loss behavior is considered normal. Whether or not this is the case is noted in the laboratory notebook.

At 24 or 48 hours, the test is stopped and the cell is cooled and depressurized. It is then noted whether any sag, settling or break has occurred in the fluid in the cell during the pressurized phase of testing. The fluid is then decanted and the filter cake thickness is measured.

EXAMPLE FOUR

Ethylene glycol, solid $CaBr_2$ and water were mixed until a clear solution formed and then xanthan gum was added until the mixture formed a paste. The composition of the mixture (Mixture #1) was as follows: 7.2 weight % xanthan gum, 51.9 weight % ethylene glycol, 21.2 weight % $CaBr_2$ and 19.7 weight % water. This paste was added to the high density brine solutions described in Table 2 so that the concentration of xanthan gum was 1 pound per 42 gallon barrel (ppb). Each solution was allowed to stir for 1 hour and rheological data was collected using procedures well known in the art.

TABLE 2

Rheologies of Various Brines with 13.9 ppb of Mixture #1 (1 ppb of xanthan)

| | 14.2 ppg CaBr$_2$ | 15.1 ppg CaCl$_2$/CaBr$_2$ | 15.6 ppg CaCl$_2$/CaBr$_2$/ ZnBr$_2$ | 19.2 ppg CaBr$_2$/ZnBr$_2$ |
|---|---|---|---|---|
| 600/300 | 62/41 | 235/132 | 141/81 | 137/82 |
| 200/100 | 32/23 | 95/54 | 57/33 | 62/38 |
| 6/3 | 6/5 | 6/4 | 5/3 | 7/6 |
| Gels | 5/7 | 5/7 | 3/2 | 6/6 |
| PV | 21 | 103 | 60 | 55 |
| YP | 20 | 29 | 21 | 27 |
| pH | 5.5 | 5.2 | 5.1 | 1.4 |
| Temp. °F. | 72 | 77 | 84 | 77 |

These four brines were examined closely and it was found that the viscosity was quite uniform throughout and fisheyes or microgels were not present.

EXAMPLE FIVE

Ethylene glycol, CaBr$_2$, water and propylene glycol were mixed until a clear solution formed, then xanthan gum was added until a paste was obtained. The mixture (Mixture #2) included 10 weight % xanthan gum, 10 weight % ethylene glycol, 22.6 weight % CaBr$_2$, 17.4 weight % water and 40 weight % propylene glycol and was added to a 14.2 pounds per gallon (ppg) CaBr$_2$ solution in an appropriate quantity so that the final viscosified brine solution contained 2 ppb of xanthan gum. The solution was allowed to stir for one hour and rheological data was collected using procedures well known in the art. The rheological results are shown in Table 3. The viscosified brine was examined closely and it was found that the viscosity was quite uniform throughout and fisheyes were not present. The rheological properties of this fluid clearly show that compositions of the present invention are superior to previously-known liquid viscosifiers with respect to even viscosification and prevention of fisheyes.

EXAMPLE SIX

Dry CaBr$_2$ was added to ethylene glycol until it completely dissolved. Then xanthan gum was added until a paste was formed. The mixture (Mixture #3) contained 10 weight % xanthan gum, 5 weight % CaBr$_2$ and 85 weight % ethylene glycol. Mixture #3 was added to a 14.2 ppg CaBr$_2$ solution so that the solution contained 2 ppb of xanthan gum, and allowed to stir for 1 hour. The rheological results are shown in Table 3. The viscosified brine was examined closely and it was found that the viscosity was quite uniform throughout and fisheyes were not present. The rheological properties of this fluid clearly show that compositions of the present invention are superior to previously-known liquid viscosifiers with respect to even viscosification and prevention of fisheyes. It should be noted for purposes of comparison that if 10 weight % xanthan gum is added to ethylene glycol in the absence of an inorganic salt, a solid gel is formed and when this gel is added to, for example, a 14.2 ppg CaBr$_2$ brine, and the xanthan does not disperse.

EXAMPLE SEVEN

Dry CaBr$_2$ was added to ethylene glycol until it completely dissolved. Then xanthan gum was added until a paste was formed. The mixture (Mixture #4) included 15 weight % xanthan gum, 5 weight % CaBr$_2$ and 80 weight % ethylene glycol. Mixture 4 was added to a 14.2 ppg solution so that the solution contained 2 ppb of xanthan gum, and allowed to stir for 1 hour. The rheological results, collected using procedures well known in the art, are shown in Table 3. The viscosified brine was examined closely and it was found that the viscosity was quite uniform throughout and fisheyes were not present. The rheological properties of this fluid clearly show that compositions of the present invention are superior to previously-known liquid viscosifiers with respect to even viscosification and prevention of fisheyes.

TABLE 3

Various Mixtures (2 ppb xanthan) in 14.2 ppg CaBr$_2$ solutions

| | Mixture #2 | Mixture #3 | Mixture #4 |
|---|---|---|---|
| 600/300 | 101/66 | 101/66 | 94/59 |
| 200/100 | 51/33 | 51/34 | 46/30 |
| 6/3 | 8/7 | 9/8 | 8/7 |
| Gels | 8/14 | 9/14 | 8/15 |
| PV | 35 | 35 | 35 |
| YP | 31 | 31 | 24 |
| pH | 4.5 | 4.9 | 4.5 |
| Temp. °F. | 72 | 72 | 76 |

EXAMPLE EIGHT

Example 2 was repeated except that a modified polysaccharide was substituted for xanthan gum. This mixture remained a thick liquid and did not form a paste. It included 10 weight % modified polysaccharide, 10 weight % ethylene glycol, 22.6 weight % CaBr$_2$, 17.4 weight % water and 40 weight % propylene glycol. This liquid (Mixture #5) was added to 14.2 ppg CaBr$_2$ so that it contained 2 ppb of modified polysaccharide. As a comparison 2 ppb of modified polysaccharide was added dry to 14.2 ppg CaBr$_2$. Both solutions were allowed to stir for 1 hour and rheological data were collected and are shown in Table 4.

TABLE 4

2 ppb of Modified Polysaccharide

| | Added Dry | Mixture #5 |
|---|---|---|
| 600/300 | 22/11 | 73/45 |
| 200/100 | 7/3 | 34/21 |
| 6/3 | 0/0 | 4/3 |
| Gels | 0/0 | 3/3 |
| PV | 11 | 28 |
| YP | 0 | 17 |
| pH | 5.4 | 4.7 |
| Temp. °F. | 71 | 73 |

EXAMPLE NINE

Example 1 was repeated except the salt used was potassium formate and with less water. The solution (Mixture #6) formed a paste and included 7.2 weight % xanthan gum, 31.0 weight % dry potassium formate, 9.9 weight % water and 51.9 weight % ethylene glycol. Mixture #6 was added to a 13.1 ppg potassium formate brine at 27.9 ppb (2 ppb of xanthan gum) (Solution #1). As a comparison, a second solution was prepared by adding 2 ppb of xanthan gum to another 13.1 ppg potassium formate brine (Solution #2). Also, to show the need of mixing the ingredients to form a thick liquid or paste, a third solution was prepared by adding the 13.1 ppg potassium formate brine to the dry potassium formate/ethylene glycol mixture, and then 2 ppb of xanthan gum was added to the solution (Solution #3). Solutions #1 and #3 included the exact components at identical concentrations. The only difference was the order in which they were mixed. All solutions were allowed to stir for 30 minutes and sheared on a Silverson mixer at 4000 rpm for 10 minutes. Table 5 shows that only solution #1 fully viscosified. The data underline the need to prehydrate the polymer in the presence of a dry salt before adding the mixture to the brine.

TABLE 5

2 ppb of xanthan gum in 13.1 ppg potassium formate solution

|  | Solution #1 | Solution #2 | Solution #3 |
| --- | --- | --- | --- |
| 600/300 | 107/66 | 39/20 | 57/32 |
| 200/100 | 49/30 | 13/7 | 22/13 |
| 6/3 | 6/5 | 1/0 | 2/1 |
| gels | 8/9 | 0/0 | 1/1 |
| PV | 49 | 19 | 25 |
| YP | 25 | 1 | 7 |
| pH | 9.9 | 9.9 | 9.9 |
| Temp. °F. | 81 | 83 | 86 |

EXAMPLE TEN

Example 1 was repeated once more using a potassium formate brine. Mixture #6 was added to a 12.5 ppg potassium formate brine at 37.7 ppg (3 ppb of xanthan gum) (Solution #4); mixture #6 was added to a 12.5 ppg potassium formate brine at 37.7 ppg (3 ppb of xanthan gum) with 0.13 ppg $Na_2B_4O_7 \cdot 10\ H_2O$ added as cross-linker for the xanthan gum (Solution #5); and mixture #6 was added to a 12.5 ppg potassium formate brine at 37.7 ppg (3 ppb of xanthan gum) with 1.30 ppg $Na_2B_4O_7 \cdot 10\ H_2O$ added as cross-linker for the xanthan gum (Solution #6). The rheological results are shown in Table 6. The viscosified brines were examined closely and it was found that the viscosity was quite uniform throughout and fisheyes were not present. The data show that adding only 0.13 ppb of borate cross-linker has almost negligible effect on the rheological properties of the formate brine, whereas adding 1.30 ppb causes a substantial thickening.

TABLE 6

3 ppb of xanthan gum in 12.5 ppg potassium formate solution with and without borate cross-linker

|  | Solution #4 | Solution #5 | Solution #6 |
| --- | --- | --- | --- |
| Borate (ppb) | none | 0.13 | 1.30 |
| 600/300 | 129/96 | 129/94 | 166/129 |
| 200/100 | 77/56 | 75/54 | 105/75 |
| 6/3 | 23/20 | 22/20 | 26/23 |
| gels | 23/28 | 22/30 | 25/54 |
| PV | 33 | 35 | 37 |
| YP | 63 | 59 | 92 |
| pH | 9.8 | 9.8 | 9.8 |
| Temp. °F. | 77 | 77 | 78 |

EXAMPLE ELEVEN

Dense brines viscosified using compositions and methods of the present invention find advantageous use as replacements for conventional drilling, drill-in, completion, hydraulic fracturing, work-over, packer, well treating, testing, spacer, or hole abandonment fluids, the utility of these fluids being well known in the art to which the invention pertains.

What is claimed is:

1. A composition for advantageously viscosifying aqueous solutions comprising:

a prehydrating alcohol having at least two hydroxyl groups, said alcohol having a molecular weight of from about 60 to about 600;

an inorganic salt; and a polymer;

wherein the polymer to prehydrating alcohol ratio is from about 1/10 to about 2/1 by weight.

2. The composition of claim 1, further comprising a solvent having a molecular weight of from about 75 to about 1000; wherein said solvent is substantially inert with respect to said polymer.

3. The composition of claim 2, wherein said solvent is an alcohol solvent.

4. The composition of claim 3, wherein said alcohol solvent is selected from the group consisting of propylene glycol, polyethylene glycols, polypropylene glycols, OH-terminated alkoxy-polyethoxylates and glycol ethers.

5. The composition of claim 1, wherein the composition comprises from about 1 to about 65 percent polymer by weight; from about 0.1 to about 50 percent salt by weight; from about 2 to about 85 percent prehydrating alcohol by weight; and from about 0 to about 60 percent by weight of a solvent having a molecular weight of from about 75 to about 1000, said solvent being substantially inert with respect to said polymer.

6. The composition of claim 1, wherein the composition comprises from about 5 to about 40 percent polymer by weight; from about 1 to about 40 percent salt by weight; from about 20 to about 85 percent prehydrating alcohol by weight; and from about 0 to about 60 percent by weight of a solvent having a molecular weight of from about 75 to about 1000, said solvent being substantially inert with respect to said polymer.

7. The composition of claim 1, wherein the polymer is xanthan gum; wherein said prehydrating alcohol is selected from the group consisting of ethylene glycol and mixtures of ethylene glycol and glycerol; the composition further comprising propylene glycol.

8. The composition according to claim 1, wherein the composition is readily dispersible in a brine having a density of at least about 10 pounds per gallon.

9. The composition of claim 1, wherein the polymer to prehydrating alcohol ratio is from about 1/8 to about 1/2 by weight.

10. The composition of claim 1, wherein the polymer to prehydrating alcohol ratio is from about 1/5 to about 1 by weight.

11. The composition of claim 1, wherein the composition comprises from about 1 to about 65 percent polymer by weight; from about 0.1 to about 50 percent salt by weight; and from about 2 to about 85 percent of said prehydrating alcohol by weight.

12. The composition of claim 1, wherein the composition comprises from about 5 to about 40 percent polymer by weight; from about 1 to about 40 percent salt by weight; and from about 10 to about 85 percent of said prehydrating alcohol by weight.

13. The composition of claim 1, wherein said polymer is selected from the group consisting of a water-soluble polymer and a water-dispersible polymer.

14. The composition of claim 1, wherein said polymer is a biopolymer.

15. The composition of claim 1, wherein said polymer is selected from the group consisting of algin, anionic cellulose, anionic polysaccharide, cationic polysaccharide, carboxymethyl cellulose, carboxymethyl hydroxyethyl cellulose, gellan gum, guar gum, gum ghatti, gum karaya, gum tragacanth, gum arabic, gum acacia, locust bean gum, methacrylic acid polymer, polyamine, polyanionic cellulose, iota, lambda or kappa sulfated polysaccharides, polysaccharides modified by i) cross-linking, ii) hydroxyethylation, iii) hydroxypropylation, iv) carboxymethyl-hydroxy-ethylation or v) carboxymethyl-hydroxypropylation, rhamsan gum, vinyl compound polymer, wellan gum, or glycol-compatible welan gum, or xanthan or xanthan gum or mixture of said polymers.

16. The composition of claim 1, wherein said prehydrating alcohol has a molar ratio of carbon atoms to hydroxyl groups of between about 0.5 and about 3.0.

17. The composition of claim 1, wherein said prehydrating alcohol is selected from the group consisting of ethylene glycol, glycerol, propylene glycol, pentaerythritol and mixtures thereof.

18. The composition of claim 1, wherein said inorganic salt is selected from the group consisting of calcium chloride, calcium bromide and potassium formate.

19. The composition of claim 1, further comprising a cross-linker.

20. The composition of claim 19, wherein the cross-linker is selected from the group consisting of boron, aluminum, titanium, vanadium, chromium, zirconium, or mixtures thereof.

21. The composition of claim 1, wherein the composition is essentially free from water.

22. A method for viscosifying an aqueous fluid comprising:
   providing a viscosifier composition comprising a polymer; a salt; and a prehydrating alcohol having at least two hydroxyl groups, the prehydrating alcohol having a molecular weight of from about 60 to about 600; wherein the polymer to prehydrating alcohol ratio of the viscosifier composition is from about 1/10 to about 2/1 by weight; and
   mixing the viscosifier composition with an aqueous fluid to provide a viscosified fluid.

23. The product obtained by performing the method of claim 22.

24. The method of claim 22, further comprising adding a cross-linker to the viscosified fluid.

25. A method for making a viscosifier composition, comprising:
   providing a polymer, a salt and a prehydrating alcohol having at least two hydroxyl groups, the prehydrating alcohol having a molecular weight of from about 60 to about 600; and
   mixing the prehydrating alcohol, the salt and the polymer to provide a viscosifier composition, wherein the polymer to prehydrating alcohol ratio of the viscosifier composition is from about 1/10 to about 2/1 by weight.

26. The product obtained by performing the method of claim 25.

27. A method for making a viscosifier composition, comprising:
   providing a polymer, a salt, a prehydrating alcohol having at least two hydroxyl groups and having a molecular weight of from about 60 to about 600, and a solvent having a molecular weight of from about 75 to about 1000, wherein the solvent is substantially inert with respect to the polymer; and
   mixing the prehydrating alcohol, the salt, the polymer and the solvent to provide a viscosifier composition, wherein the polymer to prehydrating alcohol ratio of the viscosifier composition is from about 1/10 to about 2/1 by weight.

28. The product obtained by performing the method of claim 27.

29. The method according to claim 27, further comprising adding a cross-linker to the viscosifier composition.

30. A composition for viscosifying aqueous solutions comprising:
   from about 2 to about 85 percent by weight of a prehydrating alcohol having at least two hydroxyl groups, said alcohol having a molecular weight of from about 60 to about 600;
   from about 0.1 to about 50 percent by weight of an inorganic salt;
   from about 1 to about 65 percent by weight of a polymer; and
   from 0 to about 60 percent by weight of a solvent which has a molecular weight of from about 75 to about 1000 and which is substantially inert with respect to the polymer.

31. The composition of claim 30, wherein said solvent is an alcohol solvent.

32. The composition of claim 31, wherein said alcohol solvent is selected from the group consisting of propylene glycol, polyethylene glycols, polypropylene glycols, OH-terminated alkoxy-polyethoxylates and glycol ethers.

33. The composition of claim 30, wherein the composition comprises from about 5 to about 40 percent polymer by weight; from about 1 to about 40 percent salt by weight; from about 20 to about 85 percent prehydrating alcohol by weight; and from about 0 to about 60 percent solvent by weight.

34. The composition of claim 30, wherein the polymer is xanthan gum; wherein said prehydrating alcohol is selected from the group consisting of ethylene glycol and mixtures of ethylene glycol and glycerol; and wherein said solvent is propylene glycol.

35. The composition in accordance with claim 30, wherein the polymer to prehydrating alcohol ratio is from about 1/10 to about 2/1 by weight.

36. The composition in accordance with claim 30, wherein the polymer to prehydrating alcohol ratio is from about 1/8 to about 3/2 by weight.

37. The composition in accordance with claim 30, wherein the polymer to prehydrating alcohol ratio is from about 1/5 to about 1 by weight.

38. The composition in accordance with claim 30, wherein said polymer is selected from the group consisting of a water-soluble polymer and a water-dispersible polymer.

39. The composition in accordance with claim 30, wherein said polymer is a biopolymer.

40. The composition in accordance with claim 30, wherein said polymer is selected from the group consisting of algin, anionic cellulose, anionic polysaccharide, cationic polysaccharide, carboxymethyl cellulose, carboxymethyl hydroxyethyl cellulose, gellan gum, guar gum, gum ghatti, gum karaya, gum tragacanth, gum arabic, gum acacia, locust bean gum, methacrylic acid polymer, polyamine, polyanionic cellulose, iota, lambda or kappa sulfated polysaccharides, polysaccharides modified by i) cross-linking, ii) hydroxyethylation, iii) hydroxypropylation, iv) carboxymethyl-hydroxy-ethylation or v) carboxymethyl-hydroxypropylation, rhamsan gum, vinyl compound polymer, wellan gum, or glycol-compatible wellan gum, or xanthan or xanthan gum or a mixture of said polymers.

41. The composition according to claim 30, wherein said prehydrating alcohol has a molar ratio of carbon atoms to hydroxyl groups of between about 0.5 and about 3.0.

42. The composition according to claim 30, wherein said prehydrating alcohol is selected from the group consisting of ethylene glycol, glycerol, propylene glycol, pentaerythritol and mixtures thereof.

43. The composition according to claim 30, wherein said salt is selected from the group consisting of calcium chloride, calcium bromide and potassium formate.

44. The composition according to claim 30, wherein said composition is essentially free from water.

45. A method for making a viscosifier composition, comprising:

providing a polymer, a salt and a prehydrating alcohol having at least two hydroxyl groups, the prehydrating alcohol having a molecular weight of from about 60 to about 600; and mixing the prehydrating alcohol, the salt and the polymer to provide a viscosifier composition;

wherein the viscosifier composition comprises from about 2 to about 85 percent by weight prehydrating alcohol;

from about 0.1 to about 50 percent by weight salt; from about 1 to about 65 percent by weight polymer; and from about 0 to about 60 percent by weight of a solvent which has a molecular weight of from about 75 to about 1000 and which is substantially inert with respect to the polymer.

46. The product obtained by performing the method of claim 45.

47. A method for viscosifying an aqueous fluid comprising:

providing a viscosifier composition comprising from about 2 to about 85 percent by weight of a prehydrating alcohol having at least two hydroxyl groups, said alcohol having a molecular weight of from about 60 to about 600; from about 0.1 to about 50 percent by weight of an inorganic salt; from about 1 to about 65 percent by weight of a polymer; and from about 0 to about 60 percent by weight of a solvent which has a molecular weight of from about 75 to about 1000 and which is substantially inert with respect to the polymer; and mixing the viscosifier composition with an aqueous fluid to provide a viscosified fluid.

48. The method according to claim 47, further comprising adding a cross-linker to the viscosified fluid.

49. A composition for advantageously viscosifying aqueous solutions comprising:

a prehydrating alcohol having at least two hydroxyl groups, said alcohol having a molecular weight of from about 60 to about 600;

an inorganic salt;

a polymer; and a cross-linker.

50. The composition according to claim 49, wherein the cross-linker is selected from the group consisting of boron, aluminum, titanium, vanadium, chromium, zirconium, or mixtures thereof.

51. A method for viscosifying an aqueous fluid, comprising:

providing a viscosifier composition comprising a polymer; a salt; and a prehydrating alcohol having at least two hydroxyl groups, the prehydrating alcohol having a molecular weight of from about 60 to about 600;

mixing the viscosifier composition with an aqueous fluid to provide a viscosified fluid; and introducing a cross-linker into the viscosified fluid.

* * * * *

UNITED STATES PATENT AND TRADEMARK OFFICE
CERTIFICATE OF CORRECTION

PATENT NO. : 5,785,747
DATED : July 28, 1998
INVENTOR(S) : Daniel P. Vollmer, Paul H. Javora and Robert L. Horton It is certified that error appears in the above-identified patent and that said Letters Patent is hereby corrected as shown below:

In column 2, line 15, please delete "viscosity" and insert in lieu thereof --viscosify--.

In column 3, line 3, please delete "viscosity" and insert in lieu thereof --viscosify--.

In column 6, line 17, please delete "viscosity" and insert in lieu thereof --viscosify--.

In column 8, line 47, please delete "viscosity" and insert in lieu thereof --viscosify--.

Signed and Sealed this

Eighth Day of June, 1999

Q. TODD DICKINSON

*Attest:*

*Attesting Officer*    *Acting Commissioner of Patents and Trademarks*